Feb. 16, 1943.     H. F. PITCAIRN     2,311,247
BLADE MOUNTING FOR WING AIRCRAFT
Filed Sept. 24, 1941
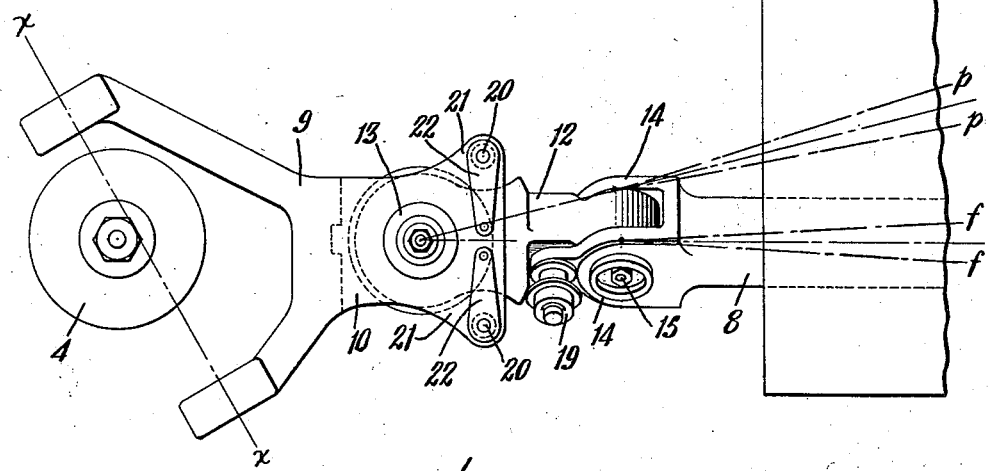
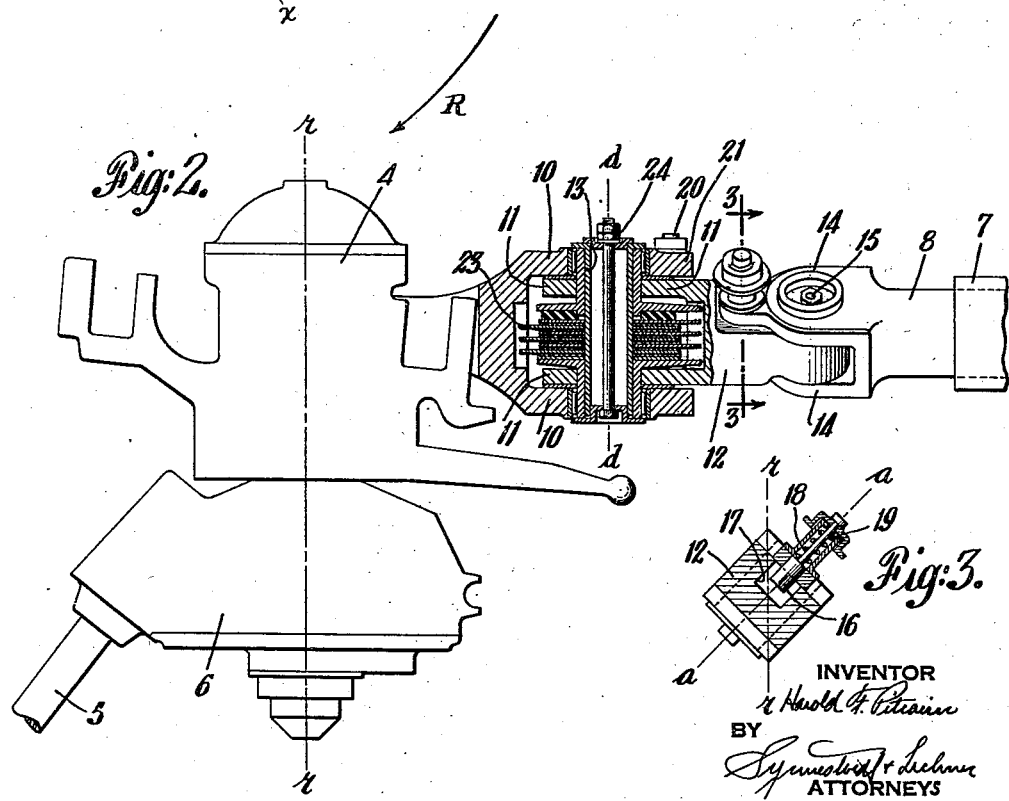

Patented Feb. 16, 1943

2,311,247

UNITED STATES PATENT OFFICE 2,311,247

BLADE MOUNTING FOR ROTARY WING AIRCRAFT

Harold F. Pitcairn, Bryn Athyn, Pa., assignor to Autogiro Company of America, Philadelphia, Pa., a corporation of Delaware Application September 24, 1941, Serial No. 412,130

9 Claims. (Cl. 244—18)

This invention relates to rotary wing aircraft and especially to a pivotal blade mounting for an aircraft sustaining rotor. The invention, moreover, is particularly useful in a sustaining rotor subject to wide variation in torque conditions, as in a helicopter having a sustaining rotor normally power driven through the hub, but capable of free rotation or autorotation for descent without power.

As is known, the blades of an aircraft sustaining rotor, especially during translational flight, are subject to forces tending to cause the blades to periodically lag and lead, in view of which so-called "drag" pivots have been employed in the mechanism connecting the blades with the rotative hub. As is also known, for a number of reasons it is desirable to damp or restrain "drag" movements of the blades. One system for restraining drag movement is disclosed in Bennett Patent 2,121,536, issued June 21, 1938, in accordance with which the drag pivot is obliquely inclined with reference to the rotor axis so that drag movement is accompanied by a component of movement about the drag pivot in the flapping sense (in a plane generally transverse the mean rotative path of travel of the blade). The flapping component of movement introduces a centrifugal restoring moment which, as fully set out in said Bennett patent, serves to damp or restrain lag-lead movements of the blade. For convenience, this type of restraint may be termed aerodynamic damping.

The present invention has reference to an adaptation of aerodynamic damping to a rotor which may be power driven by transmission of torque through the rotor hub or which may turn freely or autorotate, as in a helicopter having a rotor normally power driven, but capable of free rotation for descent or other purposes.

Because of the torque difference between the condition of power drive and the condition of free rotation, the rotor blade of the convertible type helicopter tends to take up widely divergent drag positions, the position being one of substantial lag during power drive, and approximately radial during free rotation. These two positions define a range of drag movement considerably in excess of normal lag-lead movements set up during translational flight as a result of various flight forces.

Bearing in mind that employment of aerodynamic damping results in a flapping component of movement, it will be seen that drag movement between the wide limits defined by the conditions of power drive and free rotation would be accompanied by excessive blade movements in the flapping sense about the drag pivot.

The present invention, therefore, provides means for shifting the normal flight range of aerodynamic damping, so that said range is centralized on the average position of lag for the condition of power drive, and on the truly radial position for the condition of free rotation. The arrangement of the invention, moreover, is such that the normal flight range of aerodynamic damping is automatically centralized on the average position of lag upon any change in the torque condition, whether it be increase or decrease, or cessation.

The foregoing is accomplished in accordance with the present invention by the employment of a second drag pivot disposed inboard of the oblique pivot and having its axis substantially parallel to the rotor axis. Means are also provided for restraining movement about the second drag pivot, so that the drag movement of normal flight takes place about the oblique pivot either in the condition of power drive or in the condition of free rotation, thereby providing aerodynamic damping under both conditions.

How the foregoing objects and advantages are attained will be apparent from the following description referring to the accompanying drawing, in which—

Figure 1 is a fragmentary top plan view of a portion of a blade and the mechanism for connecting the same with the rotor hub;

Figure 2 is a side elevational view, with portions in vertical section, further illustrating the arrangement of Figure 1; and Figure 3 is a sectional view through the blade mounting taken as indicated by the section line 3—3 on Figure 2.

The rotative hub 4 is suitably mounted for rotation and preferably also for tilting movement to provide control in pitch and roll, for which purpose hub structure may be employed along the lines of that disclosed in copending application of Juan de la Cierva, Serial No. 645,985, filed December 6, 1932, or in copending application of Agnew E. Larsen, Serial No. 271,841, filed May 5, 1939, which Larsen application issued as Patent No. 2,264,942 on December 2, 1941. As shown in Figure 2, the hub is adapted to be driven from power shaft 5 through suitable gearing enclosed at 6, the rotor drive preferably including not only a manually controllable clutch but also a freewheel clutch, which latter may be enclosed at 6 along with the gearing.

Although only one blade 7 is illustrated in the drawing, it will be understood that a plurality of blades are usually employed. The root end or spar 8 of each blade is connected with the rotative hub by several pivots, desirably including a flapping pivot, the axis of which is indicated in Figure 1 at x—x, this flapping pivot serving to connect the blade mounting fork 9 with the hub in a manner which need not be considered in detail herein, although for a fuller disclosure reference may be had to the aforementioned copending Larsen application. While the flapping pivot axis x—x is illustrated as forming an acute angle with the longitudinal axis of the blade at the leading side of the latter (the direction of rotation being indicated by the arrow R), such obliquity of the flapping axis is not required in accordance with the present invention, and the flapping axis may assume other positions, including the 90° position, with reference to the blade axis.

At the base end of the blade mounting member 9 (see Figure 2), fork prongs 10—10 project radially outwardly and embrace additional fork prongs 11—11 extending inwardly from the drag link 12. A drag pivot pin 13 interconnects these pairs of fork prongs and provides a drag pivot axis d—d generally paralleling the rotor axis r—r when the blade is in true radial position on the flapping pivot axis. Toward its outer end the drag link 12 is received between prongs or lugs 14—14 projecting from the blade root 8 and these prongs and the link are apertured to cooperate with a second drag pivot 15 providing an axis a—a which axis, as will be seen from inspection of Figure 3, is positioned so that, when projected on a plane perpendicular to the blade axis and containing the rotor axis r—r, it forms an oblique angle with the rotor axis.

Although axis a—a of pivot 15 is shown as inclined upwardly and forwardly with respect to the direction of rotation of the rotor, obliquity in the opposite sense will also serve to provide the aerodynamic damping.

Extreme angular movement of the blade about the pivot axis a—a is limited by a stop best shown in Figure 3, and taking the form of a retractable plunger 16 which projects into an arcuate recess 17 formed in the link 12. Spring 18 normally retains plunger 16 in its inner position, although the plunger may be withdrawn against the force of the spring by taking hold of the cap 19, the withdrawal of the plunger being provided so as to permit relatively great angular movement of the blade about the axis a—a for the purpose of folding the rotor blades.

As appears in Figure 1, stop pins 20—20, mounted in ears 21—21 formed as a part of prongs 10—10 of the blade mounting member 9, serve to limit movement of the drag link 12 and thus of the blade about the axis d—d of pivot 13. If desired, these pins may also be retractable as by handles 22, to permit extreme angular movement of the blade for folding purposes.

Referring to Figure 2, it will be seen that a friction damper device 23 is associated with the pivot 13, having interleaving friction discs, some of which are keyed to the blade mounting member 9 and some to the drag link 12, so as to resist blade movement about the axis d—d. The damping force of this device is controllable by means of adjustment nut 24. The details of construction of this blade movement control device 23 need not be considered herein since they form no part of the present invention per se. For a fuller description of a friction damper suitable for the present purpose reference may be had to Larsen Patent 2,155,427, issued April 25, 1939.

In considering the functioning of the blade mounting above described, particular reference is made to Figure 1 on which ranges of blade movement in the lag-lead sense have been indicated. When the rotor is turning freely, as by autorotation, the absence of torque on the hub permits the blade to assume an approximately radial position under the influence of centrifugal force (the full line showing of Figure 1). In this position the range of lag-lead movements of the blade about the axis a—a under the influence of normal flight forces, set up for example as a result of translational flight, will be approximately as indicated by the lines f—f. On the other hand, when the rotor is power driven the blade will assume a position of appreciable lag about the pivot axis d—d and will have a range of normal flight movements in the lag-lead sense such as that indicated by the lines p—p.

It will be observed that as between the conditions of free rotation and power drive of the rotor, the average position of the blade shifts about the pivot axis d—d. The limiting stop or plunger 16 and the arcuate recess 17 (see Figure 3) are preferably arranged to permit free movement of the blade throughout the range f—f or p—p, the stop coming into operation only after displacement of the blade about the axis a—a appreciably beyond the limits of the normal flight range.

It is now pointed out that the damper 23 for resisting movement about the upright axis d—d is adjusted to a value such that lag-lead movements of the blade within the normal flight range will take place about the pivot axis a—a and will not cause movement of the blade about the axis d—d. On the other hand, the setting of damper 23 should be such that any tendency for the blade to move beyond the normal flight range (as when applying or removing the driving torque from the hub) will overcome the resistance of the damper and, therefore, cause movement of the blade about the axis d—d. In this connection it should be kept in mind that lag-lead movement of the blade about the oblique axis a—a is accompanied by a component of motion in the flapping plane, and that the greater the amplitude of that motion the greater is the resistance to movement of the blade about the oblique axis a—a. Such increase in the resistance to movement about the axis a—a overcomes the resistance of the damper 23, and further blade movement takes place about the axis d—d.

Preferably, the damper adjustment is such as to bring about the action just described prior to displacement of the blade sufficiently to bring the limiting stop 16 into operation. In the event, however, that any blade moves beyond the normal flight range on the oblique axis a—a, said stop 16 will come into operation and positively assure that further movement of the blade will take place about the axis d—d.

Specifically, if the rotor is operating under a condition of free rotation (with the blade in the position shown in Figure 1) and torque is then delivered to the hub 4 through the drive shaft 5, a considerable lagging moment will be set up, as a result of which the resistance of damper 23 will be overcome and the drag link 12 will then be caused to swing about the axis d—d of pivot 13 so as to shift the normal flight range of damping movement to the position indicated at p—p in Figure 1. Conversely, upon cessation of driving torque, the normal flight range will again be shifted about the axis d—d to bring that range to the position indicated at f—f.

This action will take place not only upon change from "power on" to "power off" or vice versa, but also upon any appreciable increase or decrease of torque, and the action will quickly center the drag link 12 (about pivot axis d—d) with reference to the normal flight range of lag-lead movements (f—f or p—p).

The stop pins 20—20 for limiting movement of the drag link 12 about axis d—d are preferably located so as not to come into operation under any normal conditions or operations, including change-over from power on to power off, or vice versa. These stop pins, however, will prevent excessive lagging or leading movement of the drag link, which might otherwise occur under abnormal conditions, for instance when starting the rotor on the ground prior to take-off, before appreciable R. P. M. has been attained; or when the effect of an applied braking torque predominates over the centrifugal restoring moment.

From the foregoing it will be seen that aerodynamic damping of lag-lead movements of the blade incident to translational flight or other normal operating conditions is provided for under all conditions, in a rotor system which is optionally power driven or freely rotative, and this without necessitating excessive movement of the blade in the flapping sense about the oblique pivot axis a—a.

I claim:

1. For a bladed aircraft sustaining rotor adapted for free rotation, or alternatively for power drive by transmission of torque through the rotor hub, mounting mechanism for connecting a blade with the hub including two pivots the axis of one of which, when projected on a plane generally perpendicular to the blade axis and containing the rotor axis, is substantially parallel to the rotor axis, and the axis of the other of which, when projected on said plane, is obliquely inclined with respect to the rotor axis.

2. For a bladed aircraft sustaining rotor adapted for free rotation, or alternatively for power drive by transmission of torque through the rotor hub, mounting mechanism for connecting a blade with the hub including a first pivot the axis of which is generally parallel to the rotor axis, and a second pivot located radially outboard of the first pivot and positioned with its axis obliquely inclined with respect to the rotor axis when projected on a plane generally perpendicular to the blade axis and containing the rotor axis.

3. For a bladed aircraft sustaining rotor adapted for free rotation, or alternatively for power drive by transmission of torque through the rotor hub, mounting mechanism for connecting a blade with the hub including a first pivot the axis of which is generally parallel to the rotor axis, a second pivot located radially outboard of the first pivot and positioned with its axis obliquely inclined with respect to the rotor axis when projected on a plane generally perpendicular to the blade axis and containing the rotor axis, and means restraining blade movement about the axis of said first pivot except when changes in the torque application occur.

4. A construction in accordance with claim 3 in which the blade movement restraining means comprises a damper device associated with said first pivot.

5. A construction in accordance with claim 3 and further incorporating stop means normally limiting blade movement about the axis of the second pivot to a range smaller than that range of drag movement produced by a change in operating conditions from normal power drive of the rotor to free rotation of the rotor.

6. For a bladed aircraft sustaining rotor adapted for free rotation, or alternatively for power drive by transmission of torque through the rotor hub, mounting mechanism for connecting a blade with the hub including a pivot the axis of which, when projected on a plane generally perpendicular to the blade axis and containing the rotor axis, forms an oblique angle with the rotor axis, whereby lag-lead movements of the blade about said pivot axis are accompanied by a flapping component of movement about said pivot axis, means restricting movement of the blade about said pivot axis to within a limited range, and means for shifting said range to different lag-lead positions when the operating conditions of the rotor are changed from power drive to free rotation.

7. A construction in accordance with claim 6 wherein said means for shifting the range of movement comprises a second pivot disposed radially inboard of the first pivot, with its axis generally parallel to the rotor axis.

8. A construction in accordance with claim 6 wherein said means for shifting the range of movement comprises a second pivot disposed radially inward of the first pivot, with its axis generally parallel to the rotor axis, and a damper device for resisting blade movement about the axis of said second pivot, the resistive force of said damper device being sufficient to prevent blade movement about the axis of said second pivot within a range of lag-lead movement corresponding to the normal flight range, but not sufficient to resist blade movement about the axis of said second pivot upon lag-lead movement beyond said normal flight range.

9. A construction in accordance with claim 6 wherein said means for shifting the range of movement comprises a second pivot disposed radially inboard of the first pivot, with its axis generally parallel to the rotor axis, and a damper device associated with the second pivot and having a damping force sufficient to ensure movement of the blade about the first pivot under the influence of normal lag-lead flight forces.

HAROLD F. PITCAIRN.